Dec. 4, 1956  A. C. RUGE  2,772,569
FLUID PRESSURE MEASURING DEVICE
Filed July 30, 1951  3 Sheets-Sheet 1
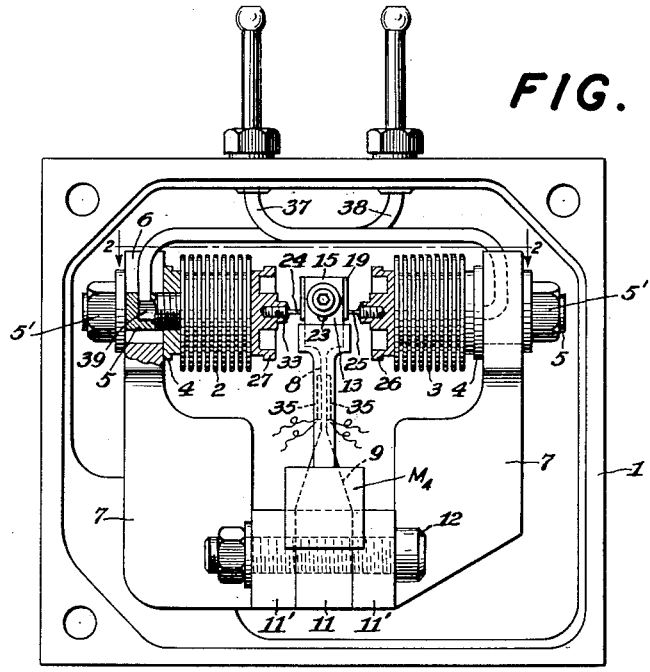
FIG. 1.
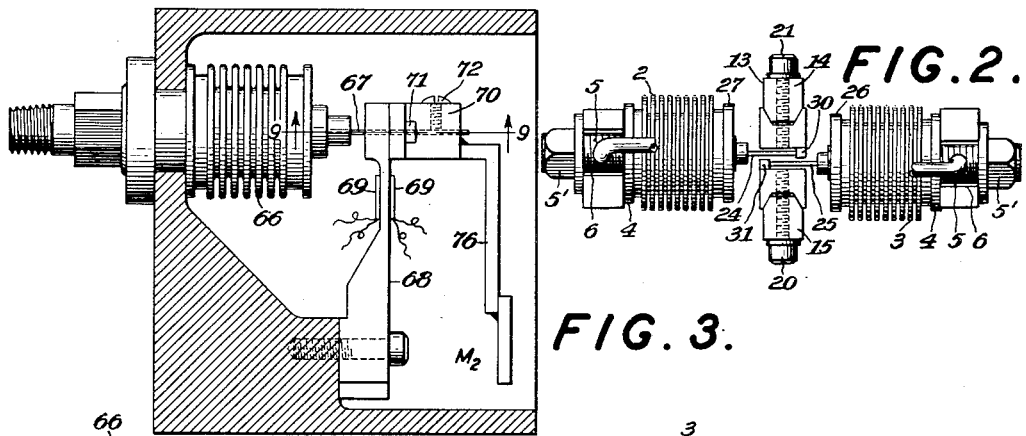
FIG. 2.
FIG. 3.
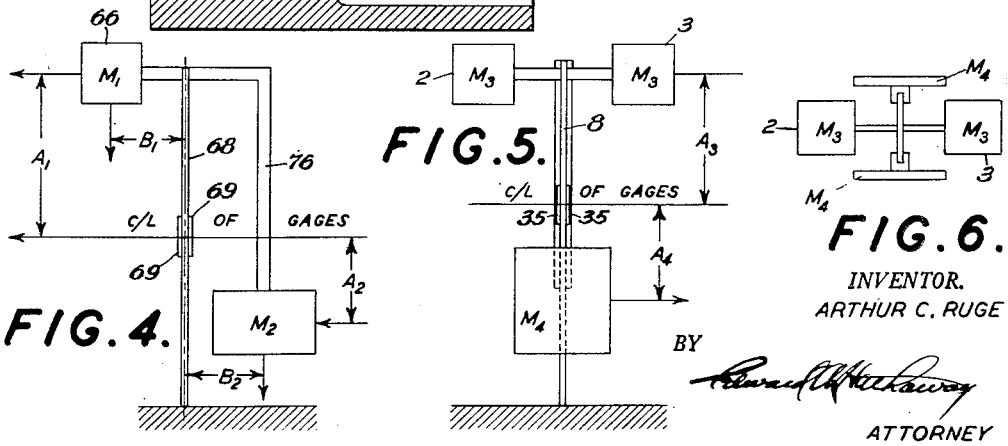
FIG. 4.
FIG. 5.
FIG. 6.
INVENTOR.
ARTHUR C. RUGE
BY
ATTORNEY

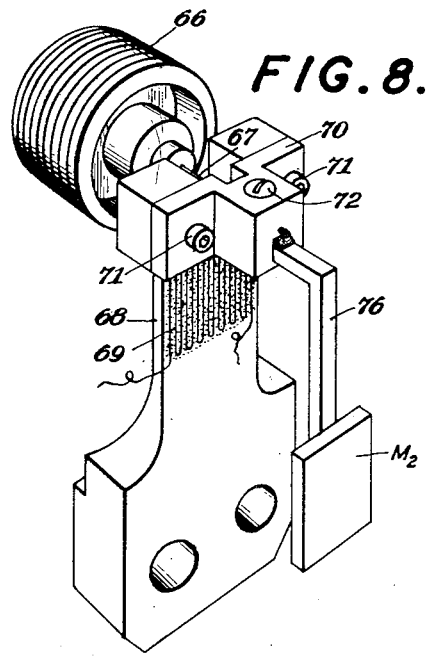
FIG. 8.
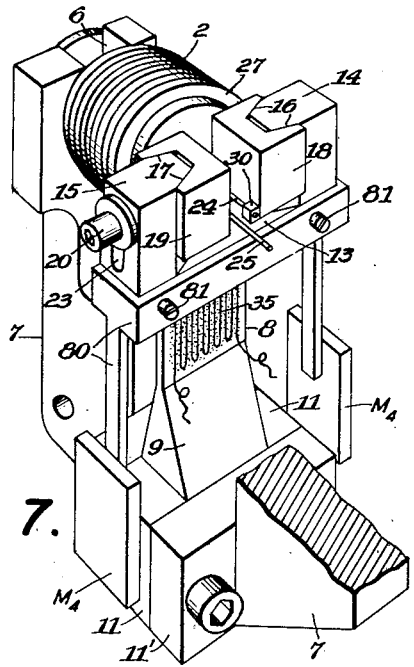
FIG. 7.
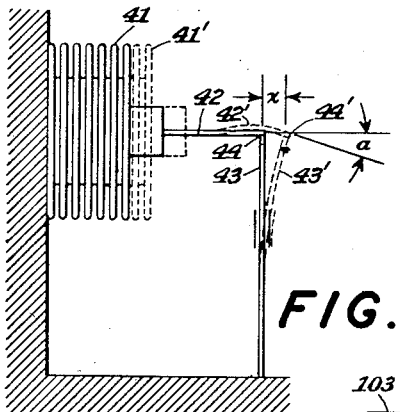
FIG. 10.
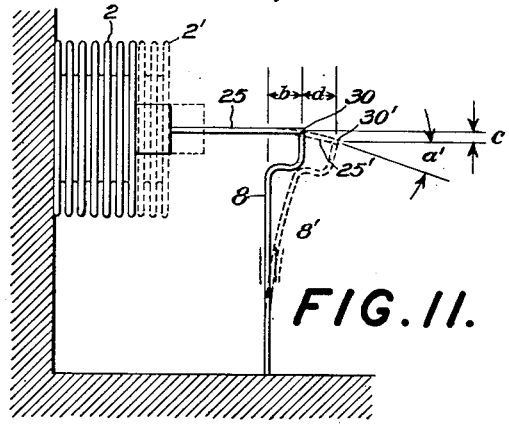
FIG. 11.
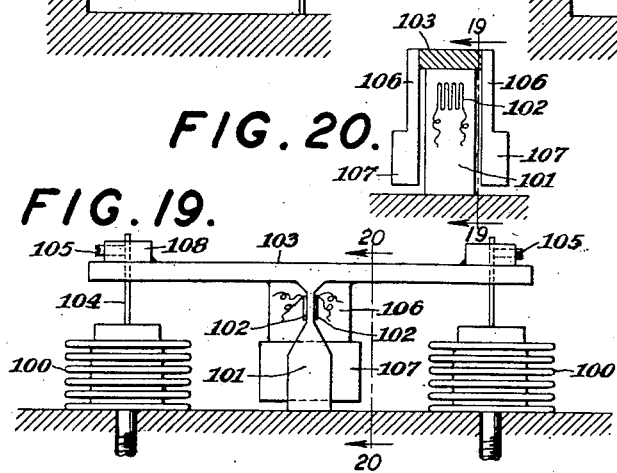
FIG. 20.
FIG. 19.
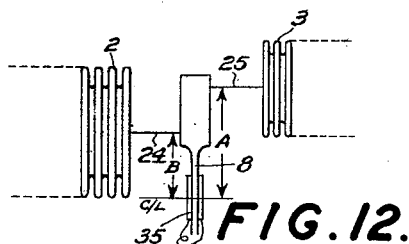
FIG. 12.
INVENTOR
ARTHUR C. RUGE
ATTORNEY Dec. 4, 1956 A. C. RUGE 2,772,569
FLUID PRESSURE MEASURING DEVICE
Filed July 30, 1951 3 Sheets-Sheet 3
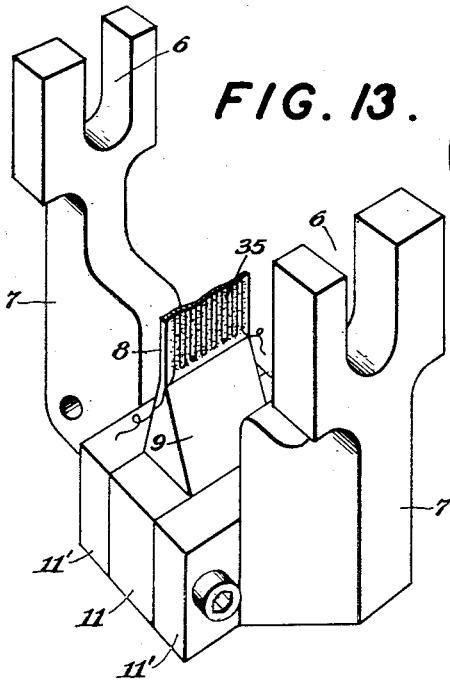
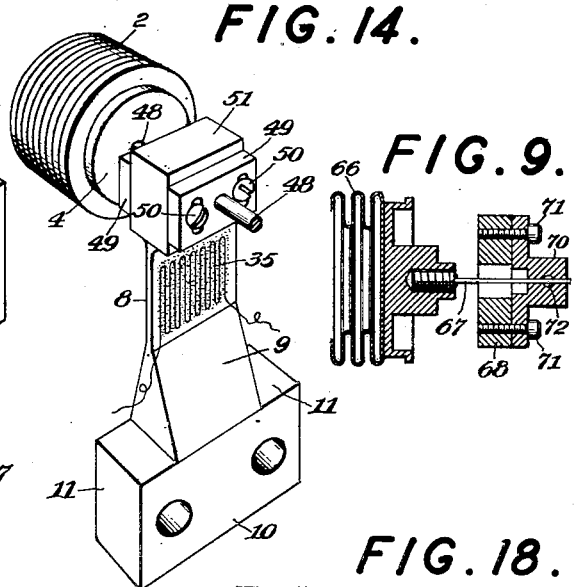
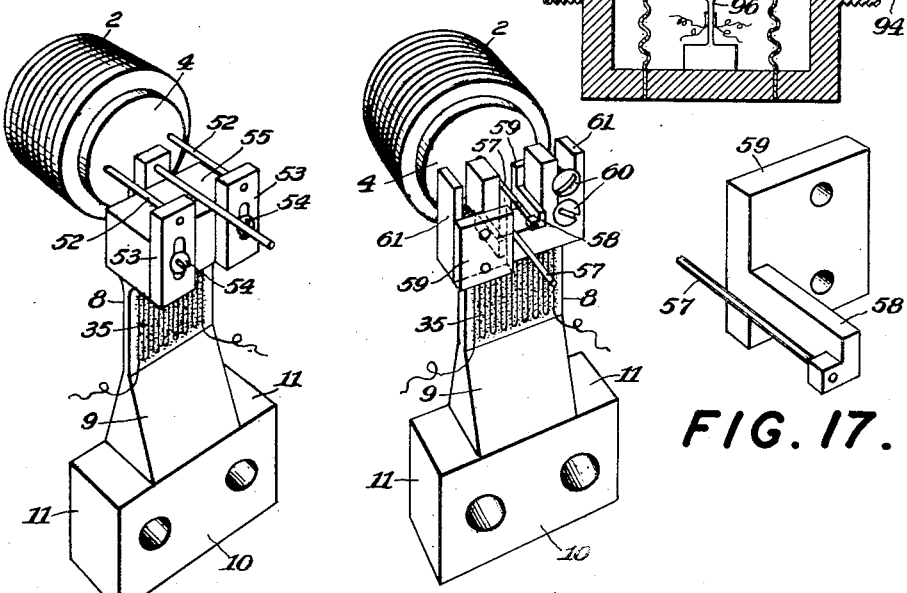
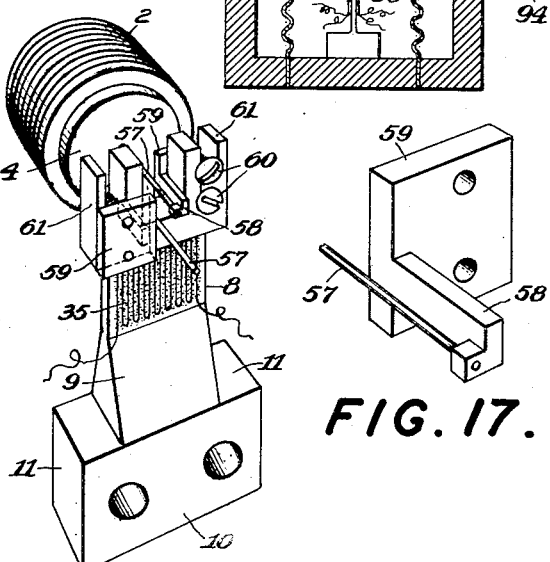
INVENTOR
ARTHUR C. RUGE
BY
ATTORNEY

United States Patent Office 2,772,569
Patented Dec. 4, 1956

2,772,569

FLUID PRESSURE MEASURING DEVICE

Arthur C. Ruge, Cambridge, Mass., assignor to Baldwin-Lima-Hamilton Corporation, a corporation of Pennsylvania Application July 30, 1951, Serial No. 239,216

16 Claims. (Cl. 73—398)

This invention relates generally to fluid pressure measuring devices and particularly those which employ an expansible pressure responsive element for actuating a bending beam to which motion responsive means are connected for determining the extent of deflection of the beam as a measure of the fluid pressure.

In devices of this type the pressure responsive element is preferably in the form of a bellows having one end fixed and the other end connected to the free end of a cantilever beam upon which I preferably mount bonded wire type strain gages for determining the extent of bending resulting from application of pressure to the bellows. Heretofore certain devices of this type had limited sensitivity and imperfect linearity because the free end of the beam was rigidly connected to the bellows thus distorting the bellows as the beam deflected. Attempts have been made to overcome this problem by interposing between the bellows and beam a pivot with jewel bearings but this resulted in certain functional deficiencies as well as being an obviously expensive and complicated arrangement. Also in the case of differential fluid pressure devices of a type employing opposed bellows connected to a common beam, extreme care has been required in an effort to have the opposed bellows of identical effective areas so that when exposed to equal pressures the beam would not deflect and introduce a corresponding error. To try to match these bellows was not only expensive but in addition it was practically impossible to obtain absolute equality and, as there has been no way heretofore to correct for even the last small amount of inequalities, it has been impossible to produce differential pressure devices with precision measuring accuracy. Another condition to be met is that when these pressure devices are mounted in moving structures such as vehicles and airplanes it has been difficult to adequately balance out acceleration effects in one or more directions.

Certain objects of my invention are therefore; to provide an improved mechanical connection between a fluid pressure expansible means and a beam so that they may respond to pressure changes with a high degree of sensitivity and linearity; to provide improved means whereby opposed expansible elements in a differential fluid pressure device need not be specially matched to obtain precision pressure balance and that corrections of even small inequalities which would otherwise be uncorrectable can be made easily and rapidly; and to provide an improved acceleration compensation means which makes the readings of the pressure device independent of its orientation with respect to the field of gravity or other acceleration field as might be present in a moving vehicle or airplane. It is a further object to accomplish all of these things in a manner that is relatively simple, compact, and economical combined with a high degree of ruggedness, reliability, and ease of maintenance, considering the precision nature of the device, but without sacrifice of accuracy, sensitivity and other desirable characteristics and functions.

Other objects and advantages will be more apparent to those skilled in the art from the description of the accompanying drawings in which:

Fig. 1 is an elevational view of a differential pressure device embodying my invention with the casing cover removed and certain parts broken away to show details of construction;

Fig. 2 is a partial plan view taken substantially on the line 2—2 of Fig. 1;

Fig. 3 is an elevational view showing a single bellows type pressure device embodying certain features of my invention and showing the casing in section;

Figs. 4, 5 and 6 diagrammatically illustrate the principles of my improved means for acceleration compensation;

Fig. 7 is a perspective of the differential pressure device of Fig. 1 but with one of the bellows and its portion of the supporting frame removed for purposes of clarity;

Fig. 8 is a perspective of the bellows and beam arrangement of Fig. 3 removed from its casing;

Fig. 9 is a partial view taken substantially on the line 9—9 of Fig. 3;

Fig. 10 diagrammatically illustrates an improvement over the rigid type connection between the bellows and beam, resulting in increased sensitivity and improved linearity of response to pressure;

Fig. 11 diagrammatically illustrates a further improved and preferred connection between the bellows and beam which effects further increased sensitivity and improved linearity;

Fig. 12 diagrammatically illustrates how opposed bellows of unequal effective areas may be used in my improved arrangement while still making it possible to correct for these inequalities even though small;

Fig. 13 is a perspective of the frame for supporting a differential pressure bellows and bending beam, only a part of the beam being shown;

Fig. 14 is a perspective of a modified arrangement for connecting the bellows to the beam so that the axes of the opposed bellows lie in a common vertical plane thereby to eliminate twisting of the beam;

Figs. 15 and 16 are still further modified connections between the bellows and beam;

Fig. 17 is a perspective of the connecting element per se used in Fig. 16;

Fig. 18 is a sectional view showing a pressure expansible diaphragm type device in place of the bellows;

Fig. 19 is an elevational view of a modified arrangement of my invention taken substantially on the line 19—19 of Fig. 20; and Fig. 20 is a cross sectional view taken substantially on the line 20—20 of Fig. 19.

In the particular embodiments of the invention which are disclosed herein for purposes of illustration, I have shown in Fig. 1 a differential pressure type device comprising a casing 1 in which is mounted a pair of opposed fluid pressure expansible elements 2 and 3 preferably in the form of metal bellows. Each of these bellows has a base 4 and an integral stud 5 which is received in a slot 6, Figs. 1 and 13, formed in supporting legs 7 and secured by nuts 5'. A bending beam portion 8, Figs. 1, 7 and 13, has a tapered base portion 9 terminating in a relatively thick base 10 provided with flanges 11, Fig. 4, which match flanges 11' extending laterally from the supporting legs 7, these flanges being connected together by bolts 12. The tapered portion not only provides an effective support for leads from strain gages to be described but also keeps the length of the active beam portion 8 as short as possible so as to reduce the deflection to an absolute minimum. The upper end of the beam has a relatively large head 13 with two laterally spaced connecting elements 14 and 15 which project vertically, i. e. in the direction of the lengthwise axis of the beam. The inner sides of elements 14 and 15 are tapered as at 16 and 17 to support a pair of vertically adjustable elements 18 and 19 held in position by screws 20 and 21, Fig. 2, which extend through vertically elongated slots 23 formed in elements 14 and 15.

To obtain a high degree of sensitivity and linearity of response of the bending beam for a given movement of the free end of the bellows I provide, Figs. 2 and 7, flexible beam-actuating connections 24 and 25 preferably in the form of piano wire secured at one end to the movable closed ends 26 and 27 of the opposed bellows and secured at their other ends to small lugs 30 and 31 of the elements 18 and 19. It will be noted that the connections of the flexible wire links to the lugs 30 and 31 occur at a point offset an appreciable distance on the far side of the center line of the beam 8 away from the bellows to which the respective wires are connected. A convenient means of attaching the wire to the closed end of the bellows is shown in Fig. 1 wherein the wire is brazed or otherwise suitably anchored in an enlarged stud 33 threaded into the closed end of the bellows. The wires are also suitably brazed or otherwise firmly held in the lugs 30 and 31.

As is customary with bending beam type pressure devices, the bending beam has suitable motion responsive means attached thereto preferably in the form of a bonded wire type strain gage 35 extending vertically on preferably both sides of the beam so that one gage is in compression and the other in tension when the beam ends in one direction or vice versa for bending in the opposite direction. By locating the gages in the proper arms of a Wheatstone bridge in a manner well known in the art I can obtain the usual cumulative effect of the gages. As differential pressures are transmitted from any suitable source through pipes 37 and 38 and thence through passages such as 39 in studs 5 to the respective bellows the beam 8 will deflect in proportion to the differential pressure in the bellows.

To illustrate the principles by which my flexible link as well as its offset point of connection permits higher degrees of beam sensitivity for a given pressure as compared to former types of connections, I have diagrammatically shown, in Fig. 10, the action of the flexible member alone. Here the force from a bellows 41 is transmitted through a flexible connecting wire or member 42 to a beam 43 at a point 44 which is substantially in line with the neutral axis of the beam. The dotted lines indicate the position of these elements after the bellows has become extended due to application of pressure, the position of the respective parts being indicated by prime marks to the same numbers. The attachment point 44 moves back to a point 44' and is shown to have moved to a distance $x$. Since deflection $x$ is a very small distance, point 44 in moving to 44' moves essentially in a horizontal line. The upper end of beam 43, however, assumes an angle with the vertical as a result of the deflection, this angle causing the end of the flexible attaching wire 3 to take up an angle $a$ with the normal to the original position of beam 43. The result is that the flexible force transmtting member 42 assumes somewhat of an S-shape.

This S-shape arrangement has an advantage quite marked as compared to the prior customary arrangements of attaching the end of the bellows directly to the beam without any interposed elastic link, for the reason that the flexible connection to a very large extent relieves the bellows of following angular distortions of the beam which result from such direct connections. In fact it leaves the bellows relatively free to move in a non-axial direction if it would tend to go that way as a result of any lack of perfect symmetry in its construction. The force-transmitting wires do not have to be extremely weak or extremely flexible in order to perform their function inasmuch as practically all bellows have considerable rigidity of their own. It is, therefore, necessary to give the flexible wire a degree of flexibility which is substantially larger than that of the bellows in order for the wire to be effective. As indicated by the dotted line deflected position of the system in Fig. 10, flexible transmitting means 42 is also substantially more flexible than beam 43.

It will be noted that my improved force transmitting members 24 and 25 are made to act elastically so that no friction or hysteresis results from their use. It has been found that the flexible force-transmitting members can be sufficiently strong to carry the bellows reaction both in tension and compression without danger of buckling and still be sufficiently flexible so as to offer very small restraint in bending.

In Fig. 11 I have diagrammatically shown the further advantage resulting from my offset connections such as 30 and 31, Fig. 2. The attachment point between the flexible wire 25 and beam 8 is indicated as being located at a distance $b$ from the neutral axis of the beam, away from bellows 2. As in Fig. 10, the dotted lines show the position of the system after being deflected a distance $d$, the new positions being indicated by the addition of primes to the same numerals. It will be readily seen that due to the offset location of point 30 relative to beam 8 a deflection $d$ causes point 30 to move to a position 30' which is lowered by a distance $c$ as a result of the deflection. In order to compare the merits of the Fig. 11 construction with that of Fig. 10, let it be assumed for the sake of argument that all corresponding parts are identical in their individual physical properties including the flexibility of the beam actuating members 42 and 25, the only difference being the offset connection of member 25 to beam 8 as compared to the non-offset connection of member 42 to beam 43. It can then be seen that for equal pressures in the bellows 41 and 2, the system of Fig. 11 will deflect farther than that of Fig. 10 because the offset connection of member 25 to beam 8 gives rise to a general reduction of bending moments throughout the system and therefore less resistance to the deflection of the bellows as a result of applied pressure.

It will thus be seen that flexible transmitting member 25 assumes a simple arc shape 25' which offers considerably less restraint to the bellows than did the construction in Fig. 10 where point 44 is in vertical alignment with the beam axis. Also the flexible member 25 is subjected to much lower bending stresses and, hence, has a higher strength for carrying the loads transmitted from the bellows to the beam. A further improvement in linearity of response is also inherent in this construction.

It will be understood that the flexible force transmitting members in either Fig. 10 or 11 need not be in the form of a round wire but instead they can be made of flat straps or any equivalent arrangement which is flexible in the direction of bending produced by the angling of the end of the beam as it responds to pressure acting on the bellows.

While the foregoing disclosure appreciably improves the sensitivity and linearity of the device yet it is desirable to obtain still further increased accuracy of response of differential bellows in order that the above improvements in sensitivity and linearity will not be dwarfed or masked by other errors that might heretofore have been present. In an attempt to obtain accuracy, the present practice in the art is to employ two bellows matched as nearly as possible as to effective areas. The accuracy with which the bellows are measured is relied upon for eliminating any response to a level of pressure which is applied equally to both bellows. However, it is difficult to match bellows to the precision necessary for accurate pressure measurement and this has been further aggravated in prior devices because of the common practice to attach the ends of the bellows directly to the beam with the result that failure to locate them exactly opposite to each other caused errors regardless of how well the bellows were initially matched. Another disadvantage of such prior arrangements is that it is not possible to use the highly advantageous method of interchangeability of parts.

To obtain a precision balance between the opposed bellows so that no movement of the sensing beam occurs when the bellows are subjected to equal pressures even though the bellows may be of different effective areas, I employ the principle of balanced moments which I am able to establish with a high degree of precision in an extremely simple and effective manner by sliding the connecting elements 18 and 19, Fig. 7, up or down as is needed. As diagrammatically shown in Fig. 12, if the bellows 2 is large and the other bellows 3 is small I can move the element 19 upwardly in a direction parallel to the lengthwise axis of the beam and move the element 18 downwardly with the result that the moment arm A acting on strain gages 35 for the relatively small bellows 3 is sufficiently greater than the moment arm B for the relatively large bellows 2 that the moments of the two bellows acting on the gages 35 can be precisely equal regardless of the difference in effective areas of the bellows. Therefore, any such difference can be compensated for so that any equal pressure applied to both bellows will not cause bending of the beam at the strain gage location. This compensating adjustment is accomplished very simply by connecting the same source of pressure to both bellows and then adjusting the bellows upward and downward relative to each other in the manner stated until the response of the strain gages to the applied pressure is substantially zero.

Normally both ends of both bellows are raised or lowered together to keep the axis of the bellows perpendicular to the axis of the beam. However, small adjustments can be made at either end of one or both bellows once the approximate position has been found. There is a very marked advantage in my arrangement from the standpoint that extremely fine adjustments can be made by moving the fixed end of one or both bellows after the beam engaging end has been set close to the proper position. This makes it possible for the assembler to achieve fine and precise adjustments in a very short time. The reason for the fineness of the adjustment achieved by moving the fixed end of the bellows is probably accounted for by the angling of the bellows produced thereby. In any event, it gives a fineness of adjustment which is much greater than can be achieved by moving the slidable members 18 and 19 which engage the beam itself. Inasmuch as the distance from the strain gages to the attachment of the flexible load transmitting members may be only about ½" in preferred forms of my invention, it will be obvious that very slight movements of the members 18 and 19 will produce considerable changes in the balance between the two bellows. When the fixed end of the bellows is moved, however, the point of application of force to the beam does not change but when the bellows undergoes an angling effect it changes the response to a second order degree.

It will be seen from the foregoing that I have provided relatively simple but very effective means for using commercially produced bellows which need not be precisely matched to each other in order for both bellows to produce substantially zero response when subjected to equal pressures.

It will be noted from Fig. 2 that the flexible connecting elements 24 and 25 by being offset from each other will produce a tendency to twist the sensing beam 8. This unsymmetrical arrangement is employed merely as a matter of practical convenience and any minute twisting that may occur is of no practical consequence since the strain gages are arranged symmetrically on the faces of the sensing beam thereby to produce a compensating effect. However, if for any reason it should be desirable to employ a symmetrical arrangement then arrangements such as those shown in Figs. 14 and 15 may be used. In Fig. 14 the flexible connection 48 is secured to the center of a block 49 which is provided with vertically elongated slots to receive screws 50 threadedly connected to a beam head 51. The blocks 49 for each of the bellows may be adjusted vertically and because the connections 48 are in a common vertical plane located centrally of the beam there will be no twisting effect whatsoever. In Fig 15 one of the bellows is provided with two symmetrically arranged connecting elements 52 fixed to blocks 53 which are vertically adjustable through a screw and slot connection 54 to the beamhead 55.

Another modification for an unsymmetrical arrangement is shown in Figs. 16 and 17 wherein each bellows has a flexible wire 57 connected to the far end of an arm 58 which projects away from a plate 59, this plate being vertically adjustably secured by screws 60 to laterally spaced slotted legs 61 extending upwardly from the beam head.

The arms 58 of the respective plates are disposed within a central opening between legs 61 and inasmuch as the two plates for the respective bellows are of identical construction they can be used in right and left hand positions because they are reversed in order to obtain the offset connecting feature such as illustrated in Fig. 11.

The principles of my invention are also applicable to a non-differential pressure device, i. e. one containing only a single bellows operating a bending beam. One form is shown in Figs. 3 and 8 wherein a bellows 66 is connected by a flexible connecting member 67, Figs. 3, 8 and 9, to a bending beam 68 having suitable bonded wire type strain gages 69 secured symmetrically on each side of the beam. To obtain the offset relation shown in Fig. 11 the connection 67 may be secured to the beam in any of the various manners shown herein above but a further modified arrangement in Figs. 3, 8 and 9 is employed consisting of having a member 70 secured in a single fixed position to the head of a bending beam by screws 71 and having an opening to receive the flexible wire 67 which is held by a set screw 72. Of course, member 70 can be made adjustable lengthwise of beam 68 if it is desired to vary the response sensitivity in that manner. Normally, the response sensitivity is preferably adjusted by electrical means in this type of device.

The differential as well as the single pressure devices will be subjected to very definite linear acceleration forces if used on a mobile body. Also, even if not in motion, they will be subjected to various components of the field of gravity depending upon their orientation thereto. This is specially true when the acceleration is applied in a direction normal to the lengthwise axis of the sensing beam. The mass of the bellows and its attachments plus the mass of the beam itself serve to bend the beam when acceleration is applied normal to its lengthwise axis. Also, in connection with the unymmetrical construction of the single bellows pressure device, Fig. 8, it will be seen that even an acceleration in the direction of the lengthwise axis of the beam will cause a response which, however, in practice is not so serious as that due to acceleration normal to the lengthwise axis of the beam. The reason for the importance of the compensation for the effects of linear acceleration is that it is highly desirable to have the response of the pressure device independent of the orientation of the device with respect to the field of gravity or other acceleration field. This is particularly important where the device is used in various positions from time to time and it is of extreme importance when the device is used for the measurement of pressure in a moving vehicle or airplane where varying and generally unknown accelerations are applied to the cell in the course of a pressure measurement.

Fig. 4 illustrates diagrammatically the principle of my improved balancing means as it is applied to the one-sided device of Fig. 8. A mass $M_2$ is supported on an arm 76 secured to the sensing beam 68 at a point above the gages 69 and shown extending normal to the beam and thence downwardly below the effective center line of the gages. The "effective" mass of the bellows, of its attaching means to the beam, and that of the beam itself is represented by a concentrated mass $M_1$, Fig. 4, located at a distance $A_1$ from the effective center line of the strain gages 69 measured along the lengthwise axis of the beam; and at a distance $B_1$ transverse to the axis of the beam on the side where the bellows is located. The "effective mass" $M_1$ is secured to beam 68 at a point above strain gages 69 and represents the amount of rigid mass which can be substituted for the bellows, its attachments to the beam, and that part of the beam above the strain gages, insofar as their masses continue to cause bending of the beam at gages 69 as a result of application of linear acceleration to the system in the plane of the figure.

When an acceleration in the plane of the figure is applied to the system just described, the "effective" mass $M_1$ will transmit acceleration forces to the beam so as to produce bending and, therefore, cause an output from the strain gages regardless of the direction of application of the acceleration. It is also obvious that since the beam also measures pressure in terms of the bending action set up by the bellows, it is impossible to distinguish between pressure and acceleration. Prior to my present invention, this has been accepted as an inherent defect of the bellows-and-beam type of pressure sensing device.

I compensate for the acceleration effect of the mass $M_1$ by attaching a second mass $M_2$ which in the illustration represents the center of gravity of the mass and its attaching arm 76. The mass $M_2$ is located at a distance $A_2$ below the effective center line of the strain gages along the lengthwise axis of the beam and at a distance $B_2$ transverse to the axis and on the side away from the bellows side of the beam but the point of attaching mass $M_2$ to the beam need only be at some convenient point above the strain gages toward the free end of the beam. For convenience, in Fig. 4, this attachment to the beam 68 is shown as being opposite that of the attachment for mass $M_1$.

Now the peculiar action of my compensating arrangement is that the mass $M_1$ acting on the upper end of the beam tends to bend the beam at the location of the gages 69 in a given direction and yet the compensating mass $M_2$, which is located below the gages and whose acceleration force is in the same direction as that of the mass $M_1$, will cause the beam to be reversely bent at the location of the gages; i. e., to be bent in a direction opposite to that which the mass $M_1$ tends to bend the beam.

For instance, if it is considered that the system is subject to a linear acceleration in the plane of the paper and normal to the lengthwise axis of the beam, it may be seen that the effective mass $M_2$ and the distance $A_2$ may be chosen so that the following equation is satisfied: $\Sigma M = 0 = M_2 A_2 - M_1 A_1$. Physically, this equation means that the inertia forces acting on masses $M_1$ and $M_2$ are exactly balanced at the effective center line of the strain gages so as to produce zero bending moment "M." There will, therefore, be no response to a linear acceleration transverse to the axis of the beam when this equation is satisfied.

Similarly, by choosing the distance $B_2$ the following equation $\Sigma M = 0 = M_2 B_2 - M_1 B_1$ can be satisfied, with the result that an acceleration applied lengthwise of the axis of the beam will produce zero bending moment "M" at the center line of the gages and therefore zero response. Thus it will be seen that the means I have provided will compensate against response to acceleration applied in any direction in the plane of the figure.

It will be further observed that even an acceleration applied perpendicular to the plane of the figure does not tend to cause the sensing beam to bend in or out of the plane of the figure because, once the first equation is satisfied, it relieves the center line of the strain gage from bending in either direction as a result of applied acceleration. Nor will there be any twisting effect as a result of acceleration normal to the plane of the figure because this is prevented by the satisfying of the second equation when considered in the light of such acceleration. Thus it will be seen that I can achieve substantially perfect compensation against linear acceleration applied to the pressure cell in any direction whatever. The reason for the qualification "substantially perfect" is that the bellows, beam, and the attaching means for the bellows and for the compensating mass $M_2$ all have some degree of flexibility, whereas in the explanation above all parts have been assumed to be perfectly rigid for the sake of simplicity. These flexibilities produce so-called second order effects which are negligible for practical purposes except where the system is subjected to very suddenly applied accelerations or to oscillatory acceleration the frequency of which approaches one or more of the natural frequencies of the system. In my preferred embodiment, I employ a simple relatively rigid means for attaching the mass $M_2$ to the beam and therefore ignore the second order effects which are too small to be of concern in the great majority of applications of pressure devices of this type.

Figs. 5, 6 and 7 illustrate the application of my principle to the acceleration balancing of a differential pressure device. This device has a symmetrical construction which makes the balancing somewhat simpler. In Figs. 5 and 6, the effective masses of the bellows 2 and 3 and their attachments with the beam are represented as the masses $M_3$. Since these masses are preferably made symmetrical about the longitudinal axis of the sensing beam, the compensating masses $M_4$ are located laterally of the beam in a plane containing the center line of the beam. In order to preserve symmetry, the mass $M_4$ is divided into two parts, one on either side of the sensing beam, although this is not essential if a slight twisting of the beam is tolerable as is the case when the strain gages are so positioned as to be unresponsive to twist as is commonly done. The masses $M_4$ are disposed below the effective center of the gages but are attached to the beam above this center by means of a relatively rigid member 80, Fig. 7, secured to the free end of the beam by suitable screws 81. In Fig. 5, satisfying the equation $\Sigma M = 0 = M_4 A_4 + M_4 A_4 - M_3 A_3 - M_3 A_3$ gives the result that acceleration in any direction produces zero bending moment "M" at the effective center line of the gages. The balancing structure disclosed is simple, inexpensive, and involves no mechanical hinges or joints and can be made extremely effective merely by adjusting the masses $M_4$ such as by filing or drilling the same, or by the addition of a little solder. Any reference herein to the masses being "above" or "below" the gages is simply for relative purposes in defining the device which may lie on its side or in various other positions in actual use.

In Fig. 18 I employ, in place of bellows, diaphragms 92 suitably supported in a chamber structure 93 to form a fluid pressure expansible element responding to pressure admitted through passages 94. These diaphragms are connected by wire links 95 to a beam 96. All of the heretofore described features are used in this Fig. 18 but for purposes of simplicity are not again shown in detail.

In Fig. 19 I have shown pressure expansible elements in the form of two bellows 100 placed with their axes parallel to each other, the bellows being connected to a bending beam 101 by a connecting means including a relatively rigid member 103 and flexible beam-actuating means 104 attached in any desired manner to member 103 such, for example, as by set screws 105. Strain gages 102 are mounted on the beam to measure the extent of its bending. If it is desired to compensate this device for acceleration forces, compensating masses 107 are mounted on arms 106 which project down from member 103 along each side of the bending beam 101. It is assumed that the effective mass of the connecting means and bellows has its center of gravity above strain gages 102. Therefore, compensating masses 107 are indicated as lying below gages 102. Should the construction be such that the effective mass of the connecting means and bellows lies below gages 102, then the balancing masses 107 would be positioned above the location of gages 102. In either case, the objective is to satisfy the same conditions as were discussed in the case of Fig. 5.

To ballance bellows of unequal effective areas the bellows and connections 104 are adjustably located at such distances from the binding beam 101 as will produce zero bending at the gages 102 when equal pressures are applied to expansible elements 100. Thus, it will be understood that after the proper location of the bellows 104 is determined the set screw hubs 108 may be soldered or otherwise secured in position on member 103.

From the foregoing disclosure it is seen that I have provided a fluid pressure measuring device that has a high degree of sensitivity, linearity, accuracy of response, and acceleration compensation, all of which is accomplished in a very effective manner with commercially available parts or parts which of themselves do not need to be made with great precision but which, when combined and used according to the principles of my invention, are able to cooperate to produce a highly precision type device whether for differential or non-differential pressures.

It will, of course, be understood that various changes in details of construction and arrangement of parts may be made by those skilled in the art without departing from the spirit of the invention as set forth in the appended claims.

I claim:

1. Fluid pressure responsive apparatus comprising, in combination, a base, a fluid pressure expansible element having a fixed end supported by said base and the other end free to expand in a given direction in response to an applied fluid pressure, a bending beam having a lengthwise axis which is substantially normal to said direction of expansion of the expansible element and having a surface which undergoes strain as a result of flexing about an axis transverse to said lengthwise axis, one end of said beam being fixed to said base and the other end being free to move so as to flex the beam about the axis transverse to the lengthwise axis, means connecting said free end of said beam to said free end of the expansible element so as to flex said beam in accordance with expansion of said expansible element, said connecting means including a flexible beam-actuating member extending substantially normal to said beam lengthwise axis whereby the flexible member and beam both flex upon application of pressure to said expansible element, said beam-actuating member having a flexibility substantially larger than that of the expansible element and such that the bellows is substantially relieved of stress transverse to its direction of expansion due to deviation of the free end of the beam from a straight line path during flexing of the beam in response to applied fluid pressure, and strain responsive means secured to the surface of said beam so as to be responsive to the surface strain thereof for determining the extent of flexing thereof as a measure of the fluid pressure applied to the expansible element, said flexible member being connected to said beam at a point offset from said lengthwise beam axis on the side thereof away from the expansible element.

2. Fluid pressure responsive apparatus comprising, in combination, a base, a fluid pressure expansible element having a fixed end supported by said base and the other end free to expand in a given direction in response to an applied fluid pressure, a bending beam having a lengthwise axis which is substantially normal to said direction of expansion of the expansible element and having a surface which undergoes strain as a result of flexing about an axis transverse to said lengthwise axis, one end of said beam being fixed to said base and the other end being free to move so as to flex the beam about the axis transverse to the lengthwise axis, means connecting said free end of said beam to said free end of the expansible element so as to flex said beam in accordance with expansion of said expansible element, said connecting means including a flexible beam-actuating member extending substantially normal to said beam lengthwise axis whereby the flexible member and beam both flex upon application of pressure to said expansible element, said beam-actuating member having a flexibility substantially larger than that of the expansible element and such that the bellows is substantially relieved of stress transverse to its direction of expansion due to deviation of the free end of the beam from a straight line path during flexing of the beam in response to applied fluid pressure, and strain responsive means secured to the surface of said beam so as to be responsive to the surface strain thereof for determining the extent of flexing thereof as a measure of the fluid pressure applied to the expansible element, said connecting means also including a member continuously engaging said beam and being adjustable in the direction of said beam lengthwise axis and to which the flexible member is connected whereby the moment arm of the beam and expansible element may be varied.

3. Fluid pressure responsive apparatus comprising, in combination, a base, a fluid pressure expansible element having a fixed end supported by said base and the other end free to expand in a given direction in response to an applied fluid pressure, a bending beam having a lengthwise axis which is substantially normal to said direction of expansion of the expansible element and having a surface which undergoes strain as a result of flexing about an axis transverse to said lengthwise axis, one end of said beam being fixed to said base and the other end being free to move so as to flex the beam about the axis transverse to the lengthwise axis, means connecting said free end of said beam to said free end of the expansible element so as to flex said beam in accordance with expansion of said expansible element, said connecting means including a flexible beam-actuating member extending substantially normal to said beam lengthwise axis whereby the flexible member and beam both flex upon application of pressure to said expansible element, said beam-actuating member having a flexibility substantially larger than. that of the expansible element and such that the bellows is substantially relieved of stress transverse to its direction of expansion due to deviation of the free end of the beam from a straight line path during flexing of the beam in response to applied fluid pressure, and strain responsive means secured to the surface of said beam so as to be responsive to the surface strain thereof for determining the extent of flexing thereof as a measure of the fluid pressure applied to the expansible element, said connecting means also including a member engaging said beam and adjustable lengthwise of said beam lengthwise axis and to which the flexible member is connected whereby the moment arm of the beam and expansible element may be varied to adjust the sensitivity of the device, said expansible element being suported by said base through a member having provision for adjusting the position of the expansible element in a direction substantially parallel to said beam lengthwise axis whereby the sensitivity of the device can be further adjusted but to a finer degree than is possible with said other adjustment for a corresponding movement parallel to the beam axis.

4. A differential fluid pressure measuring device having a base structure, the pressure expansible elements supporting by said base structure, a cantilever bending beam having a lengthwise axis, said beam being rigidly held fixed at a portion thereof located on said axis and having another portion thereof free to move so as to flex said beam about an axis transverse to the lengthwise axis, means including flexible beam actuating means connecting the movable portion of said beam to both of said expansible elements so that the application of pressure to one element produces bending in the beam in a direction opposite to that produced by application of pressure to the other of said elements, and strain sensitive means connected to said beam at a point for determining the extent of strain in the beam arising from flexing of the beam as a measure of the pressure for effecting such flexing.

5. The combination set forth in claim 4 further characterized by the provision of mechanically adjustable means for shifting the connection of at least one of said flexible beam-actuating means relative to the beam so that the two actuating means produce equal beam bending moments against each other when subjected to equal pressures with the result that the beam will be substantially unflexed.

6. The combination set forth in claim 4 further characterized by the provision of means for relatively moving the point of connection of at least one of said flexible beam-actuating means along the beam lengthwise axis so that unequal forces produced by equal pressures acting on expansible elements of unequal effective areas may be balanced to produce a substantially zero bending moment of the beam at the effective point of measurement of said strain sensitive means.

7. The combination set forth in claim 4 further characterized by the provision of means for relatively moving the point of connection of at least one of said flexible members along the beam lengthwise axis so that unequal forces produced by equal pressures acting on expansible elements of unequal effective areas may be balanced to produce a substantially zero bending moment of the beam at the effective point of measurement of said responsive means, at least one of said expansible elements being supported by said base through a member having provision for adjusting the position of said expansible element in a direction parallel to said beam lengthwise axis to facilitate said balancing.

8. The combination set forth in claim 4 further characterized in that the connection means includes a beam-engaging support to which at least one of the flexible members is connected, and a guide means formed on said beam toward said movable end thereof and extending in the direction of the lengthwise axis of the beam so that said support is movable on said guide means for independent adjustment in the direction of the lengthwise axis of said beam.

9. The combination set forth in claim 4 further characterized in that the connecting means includes plates having arms to which the flexible members are connected, and means securing said plates to said beam for adjustment in a direction lengthwise of said beam axis and each arm extending from the beam in a direction away from the expansible elements to which the arm is connected.

10. The combination set forth in claim 4 further characterized in that the connecting means includes elements for securing said flexible connections to said beam so that the connecting means is symmetrical with respect to the beam lengthwise axis when viewed along the direction of said axis.

11. The combination set forth in claim 4 further characterized by the provision of relatively rigid means secured to said beam near its movable end and extending in the direction of its lengthwise axis beyond the point where the strain responsive means is connected to the beam, said secured means including an element having mass thereby to compensate for acceleration forces due to other masses such as a portion of the expansible element and the beam-actuating means tending to bend said beam at such point.

12. A differential fluid pressure measuring device having two pressure expansible elements each having fixed and movable portions, a bending beam having a lengthwise axis with fixed and movable ends at the opposite ends thereof, the movable end of the beam extending between the movable portions of the expansible elements, means including flexible beam-actuating means connecting the movable end of said beam to the movable portion of both of said expansible elements so that the application of pressure to one element produces bending in the beam in a direction opposite to that produced by application of pressure to the other of said elements, strain responsive means connected to said beam at a point for determining the extent of flexing of the beam as a measure of the pressure for effecting such bending, and means providing a mass which is disposed at the far side of the strain responsive means as measured in the direction of said lengthwise axis from the point of connection of said actuating means, said means being connected to the beam at the near side of the strain responsive means so as to compensate for acceleration forces due to masses such as a portion of the bellows and the beam-actuating means tending to bend said beam at a given point, said strain responsive means being responsive to the bending of said beam at said point as a result of fluid pressure.

13. A fluid pressure measuring device having a fluid pressure expansible element adapted to expand in a given direction in response to applied fluid pressure, a cantilever beam having a fixed end and its other end being movable upon flexing of the beam, said beam having a lengthwise axis substantially normal to the direction of movement of the expansible element, means connected to said beam for determinnig the extent of bending thereof at a predetermined point as a measure of the pressure for effecting such bending, a compensating mass, means for connecting said compensating mass to the movable end of said beam on the side of said predetermined point toward the movable end of the beam and the mass being located on the other side of said predetermined point so as to compensate for the effect of acceleration normal to said beam lengthwise of the axis.

14. The combination set forth in claim 13 further characterized in that said means for connecting the compensating mass to the beam also supports the mass at the side of said beam lengthwise axis away from the expansible element for a distance sufficient to compensate for acceleration forces acting in the direction of the beam lengthwise axis.

15. The combination set forth in claim 13 further characterized by the provision of a second fluid pressure expansible element adapted to expand in opposition to the movement of the other expansible element in response to a second applied fluid pressure thereby to provide a differential fluid pressure response, said cantilever beam being also connected to the second expansible element and being interposed between said elements, and said mass also being connected to said beam laterally thereof but in a plane containing its lengthwise axis.

16. The combination set forth in claim 15 further characterized in that said compensating mass is divided substantially equally and laterally of the beam.

References Cited in the file of this patent

UNITED STATES PATENTS

| | | |
|---|---|---|
| 1,340,399 | Ohlson | May 18, 1920 |
| 2,034,909 | Kollsman | Mar. 24, 1936 |
| 2,311,900 | Newell | Feb. 23, 1943 |
| 2,316,975 | Ruge (2) | Apr. 20, 1943 |
| 2,347,341 | Rourke | Apr. 25, 1944 |
| 2,427,249 | Birch | Sept. 9, 1947 |
| 2,442,938 | Ruge | June 8, 1948 |
| 2,446,546 | Meston | Aug. 10, 1948 |
| 2,491,998 | Mikina | Dec. 20, 1949 |
| 2,533,998 | Cole | Dec. 12, 1950 |
| 2,535,202 | Gregory et al. | Dec. 26, 1950 |
| 2,593,169 | Moore | Apr. 15, 1952 |
| 2,598,681 | Garbarini et al. | June 3, 1952 |

FOREIGN PATENTS

| | | |
|---|---|---|
| 109,365 | Great Britain | Sept. 13, 1917 |
| 262,672 | Great Britain | Dec. 16, 1926 |